(12) United States Patent
Rastegar et al.

(10) Patent No.: US 10,393,526 B2
(45) Date of Patent: *Aug. 27, 2019

(54) INTEGRATED MEMS INERTIAL SENSING DEVICE (71) Applicant: mCube Inc., San Jose, CA (US)

(72) Inventors: Ali J. Rastegar, San Jose, CA (US); Sanjay Bhandari, San Jose, CA (US)

(73) Assignee: mCube, Inc., San Jose, CA (US)

(*) Notice: Subject to any disclaimer, the term of this patent is extended or adjusted under 35 U.S.C. 154(b) by 246 days.

This patent is subject to a terminal disclaimer.

(21) Appl. No.: 15/365,851

(22) Filed: Nov. 30, 2016

(65) Prior Publication Data
US 2017/0082438 A1 Mar. 23, 2017

Related U.S. Application Data (63) Continuation of application No. 14/158,756, filed on Jan. 17, 2014, now Pat. No. 9,513,122.

(60) Provisional application No. 61/755,451, filed on Jan. 22, 2013, provisional application No. 61/755,450, filed on Jan. 22, 2013.

(51) Int. Cl.
G01C 19/5776 (2012.01)
G01C 19/5712 (2012.01)
G01C 19/5783 (2012.01)

(52) U.S. Cl.
CPC ..... *G01C 19/5776* (2013.01); *G01C 19/5712* (2013.01); *G01C 19/5783* (2013.01)

(58) Field of Classification Search
CPC ............ G01C 19/5776; G01C 19/5712; G01C 19/5783; G01C 19/5719; G01C 19/5762; G01C 19/5726; G01P 15/18
See application file for complete search history.

(56) References Cited

U.S. PATENT DOCUMENTS

| | | | | |
|---|---|---|---|---|
| 8,714,012 B2* | 5/2014 | Caminada | .......... | G01C 19/5762 73/504.12 |
| 9,513,122 B2* | 12/2016 | Rastegar | ............ | G01C 19/5776 |
| 9,541,396 B2* | 1/2017 | Bhandari | ................ | G01P 15/18 |
| 9,612,119 B2* | 4/2017 | Bhandari | ............ | G01C 19/5776 |
| 10,107,625 B2* | 10/2018 | Bhandari | ............ | G01C 19/5712 |
| 2003/0141925 A1* | 7/2003 | Lennous | ................ | G06G 7/186 327/553 |
| 2008/0000296 A1* | 1/2008 | Johnson | ............. | G01C 19/5719 73/514.18 |
| 2011/0197674 A1* | 8/2011 | Prandi | ................ | G01C 19/5726 73/504.12 |
| 2011/0249269 A1* | 10/2011 | Bouyat | .................. | G01C 19/66 356/476 |

(Continued)

*Primary Examiner* — Helen C Kwok
(74) *Attorney, Agent, or Firm* — Richard T. Ogawa; Ogawa P.C.

(57) ABSTRACT

An integrated MEMS inertial sensing device can include a MEMS inertial sensor with a drive loop configuration overlying a CMOS IC substrate. The CMOS IC substrate can include an AGC loop circuit coupled to the MEMS inertial sensor. The AGC loop acts in a way such that generated desired signal amplitude out of the drive signal maintains MEMS resonator velocity at a desired frequency and amplitude. A benefit of the AGC loop is that the charge pump of the HV driver inherently includes a 'time constant' for charging up of its output voltage. This incorporates the Low pass functionality in to the AGC loop without requiring additional circuitry.

23 Claims, 5 Drawing Sheets (56) References Cited

U.S. PATENT DOCUMENTS

2012/0049772 A1* 3/2012 Moussaoui ......... H02M 3/1588
318/376

* cited by examiner

INTEGRATED MEMS INERTIAL SENSING DEVICE

CROSS-REFERENCES TO RELATED APPLICATIONS

The present application is a continuation application of U.S. patent application Ser. No. 14/158,756, filed Jan. 17, 2014, which claims priority to U.S. Provisional App. 61/755,451, filed Jan. 22, 2013 and U.S. Provisional App. 61/755,450, filed Jan. 22, 2013, the contents of all of which are incorporated by reference for all purposes.

BACKGROUND OF THE INVENTION

The present invention is directed to MEMS (Micro-Electro-Mechanical-Systems). More specifically, embodiments of the invention provide methods and structure for improving integrated MEMS devices, including inertial sensors and the like. Merely by way of example, the MEMS device can include at least an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

Research and development in integrated microelectronics have continued to produce astounding progress in CMOS and MEMS. CMOS technology has become the predominant fabrication technology for integrated circuits (IC). MEMS, however, continues to rely upon conventional process technologies. In layman's terms, microelectronic ICs are the "brains" of an integrated device which provides decision-making capabilities, whereas MEMS are the "eyes" and "arms" that provide the ability to sense and control the environment. Some examples of the widespread application of these technologies are the switches in radio frequency (RF) antenna systems, such as those in the iPhone™ device by Apple, Inc. of Cupertino, Calif., and the Blackberry™ phone by Research In Motion Limited of Waterloo, Ontario, Canada, and accelerometers in sensor-equipped game devices, such as those in the Wii™ controller manufactured by Nintendo Company Limited of Japan. Though they are not always easily identifiable, these technologies are becoming ever more prevalent in society every day.

Beyond consumer electronics, use of IC and MEMS has limitless applications through modular measurement devices such as accelerometers, gyroscopes, actuators, and sensors. In conventional vehicles, accelerometers and gyroscopes are used to deploy airbags and trigger dynamic stability control functions, respectively. MEMS gyroscopes can also be used for image stabilization systems in video and still cameras, and automatic steering systems in airplanes and torpedoes. Biological MEMS (Bio-MEMS) implement biosensors and chemical sensors for Lab-On-Chip applications, which integrate one or more laboratory functions on a single millimeter-sized chip only. Other applications include Internet and telephone networks, security and financial applications, and health care and medical systems. As described previously, ICs and MEMS can be used to practically engage in various type of environmental interaction.

Although highly successful, ICs and in particular MEMS still have limitations. Similar to IC development, MEMS development, which focuses on increasing performance, reducing size, and decreasing cost, continues to be challenging. Additionally, applications of MEMS often require increasingly complex microsystems that desire greater computational power. Unfortunately, such applications generally do not exist. These and other limitations of conventional MEMS and ICs may be further described throughout the present specification and more particularly below.

From the above, it is seen that techniques for improving operation of integrated circuit devices and MEMS are highly desired.

BRIEF SUMMARY OF THE INVENTION

The present invention is directed to MEMS (Micro-Electro-Mechanical-Systems). More specifically, embodiments of the invention provide methods and structure for improving integrated MEMS devices, including inertial sensors and the like. Merely by way of example, the MEMS device can include at least an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

The present invention includes a drive loop configuration for an integrated MEMS inertial sensing device. According to an embodiment, a Gyroscope or inertial sensing system has a drive element that needs to resonate continuously at desired frequency and amplitude. To maintain this oscillation of MEMS element, the drive loop invented consists of a Signal acting as driving force to a MEMS resonator, the feedback signal from MEMS sensor, amplifier CSA_DRV, 90 degree phase shifter, rectifier, Proportional Integral Derivative (PID) controller, comparator, charge pump providing supply voltage to the High-Voltage (HV) driver and the signal input to the HV driver that is generated from the feedback element of MEMS driver.

The CSA_DRV senses the change in capacitance due to drive element and converts it in to voltage signal. In order to provide in-phase feedback signal, a 90 degree phase shifter, PS0, is added in the drive loop. The 90 degree phase shift can be implemented as differentiator or integrator or other known techniques.

The rectifier block rectifies the signal from phase shifter. A Low pass filter may typically be applied to this signal to provide average envelope of the detected feedback signal. The average amplitude is then compared with the desired amplitude provided by the reference signal coming from band-gap or similar on-chip or off-chip reference in the Proportional, Integral, Derivative (PID) controller. The PID block provides multiple functionalities in the Automatic Gain Control (AGC) loop. During the normal operation, when the loop is closed, the output of the PID block is proportional to the difference in amplitude between 'magnitude' of the detected signal (based on envelope information provided by rectifier), to the reference signal Vref. The proportional functionality may have some gain or may be unity. In order for the loop to filter out fast transients and act on 'average' information, the PID block incorporates an 'Integrator'. The time constant of the integrator is kept programmable so that the AGC loop can either be made faster or slower. However, before the drive loop is closed, for example right after power-up of Gyro, it is desired that the AGC loop act much faster instead of averaging for a long time. This functionality is implemented by the 'Differentiator' of the PID block. The differentiator allows shorter time to close the loop which helps in smaller 'start-up time' for the Gyroscope.

When the MEMS drive resonator generates signal at lower amplitude than desired, the AGC loop needs to act in a way that will increase the force to the MEMS driver resonator which will, in turn, increase the feedback signal. On the other hand when the MEMS drive resonator generates signal at higher amplitude than desired, the AGC loop needs to act in a way that will decrease the force to the MEMS driver resonator which will, in turn, decrease the feedback signal.

This invention proposes an implementation that implements this AGC mechanism in an efficient way at low power.

Various additional objects, features and advantages of the present invention can be more fully appreciated with reference to the detailed description and accompanying drawings that follow.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

The present invention is directed to MEMS (Micro-Electro-Mechanical-Systems). More specifically, embodiments of the invention provide methods and structures for improving integrated MEMS devices, including inertial sensors and the like. Merely by way of example, the MEMS device can include at least an accelerometer, a gyroscope, a magnetic sensor, a pressure sensor, a microphone, a humidity sensor, a temperature sensor, a chemical sensor, a biosensor, an inertial sensor, and others. But it will be recognized that the invention has a much broader range of applicability.

Figure 1:
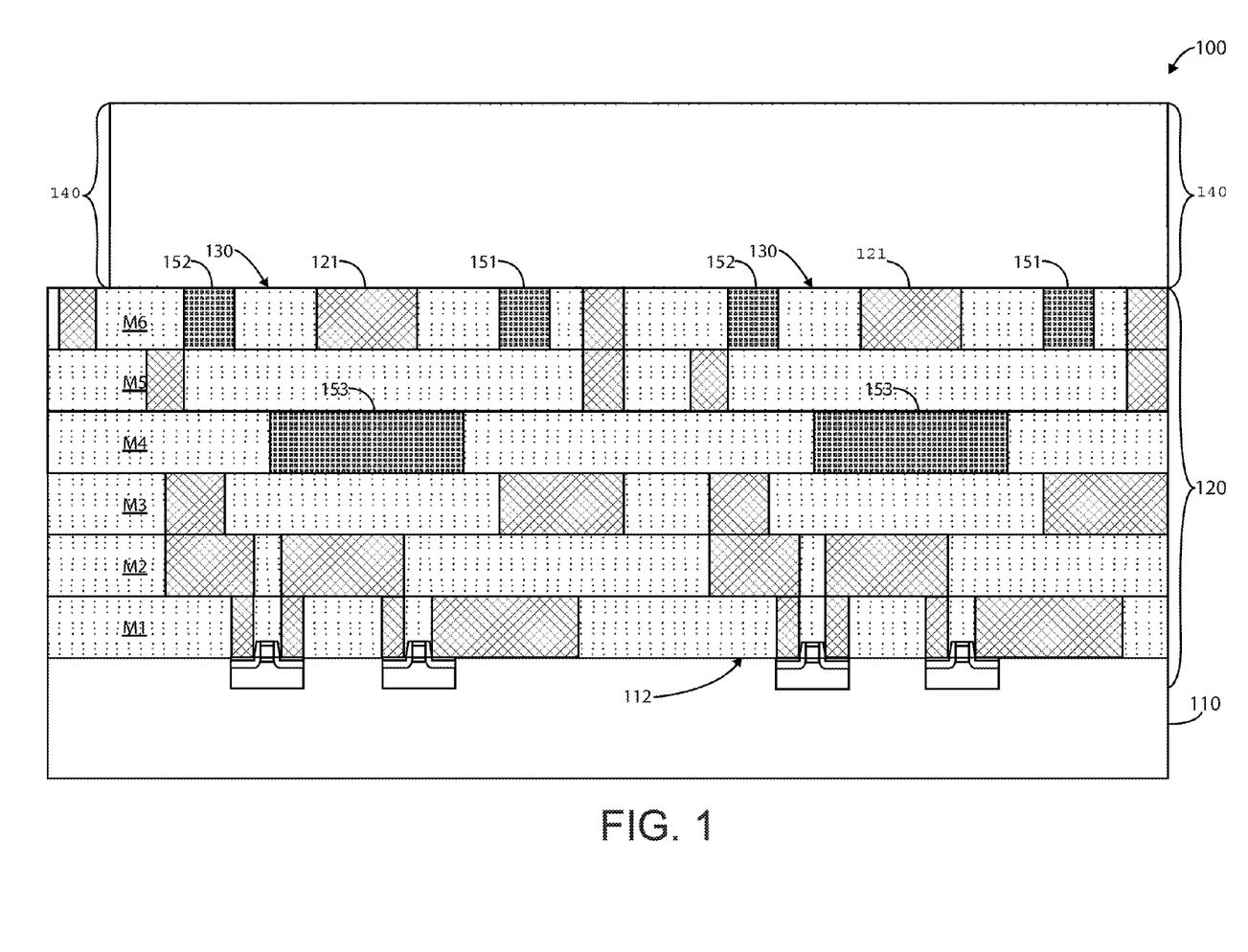
FIG. 1 is a simplified diagram illustrating a cross-sectional view of an integrated MEMS inertial sensing device according to an embodiment of the present invention.

FIG. 1 is a simplified diagram illustrating a cross-sectional view of an MEMS gyroscope device according to an embodiment of the present invention. The integrated MEMS gyroscope device 100 includes a substrate 110 having a surface region 112, and a CMOS IC layer 120 overlying surface region 112 of substrate 110. CMOS IC layer 120 has a CMOS surface region 130. In some embodiments, CMOS IC layer 120 can include CMOS devices in substrate 110 and can including multilevel metal interconnect structures. The example shown in FIG. 1 includes six metal layers, M1-M6. The integrated MEMS gyroscope device 100 also includes a MEMS gyroscope 140 overlying the CMOS surface region, and includes an out-of-plane sense plate 121. Integrated MEMS gyroscope device 100 also includes metal shielding within a vicinity of the MEMS device configured to reduce parasitic effects. In the example of FIG. 1, metal regions 151 and 152 are shields on the sides of the plate, while 153 is the shield below the plate on metal 4. Those of ordinary skill in the art will recognize other variations, modifications, and alternatives.

Figure 2:
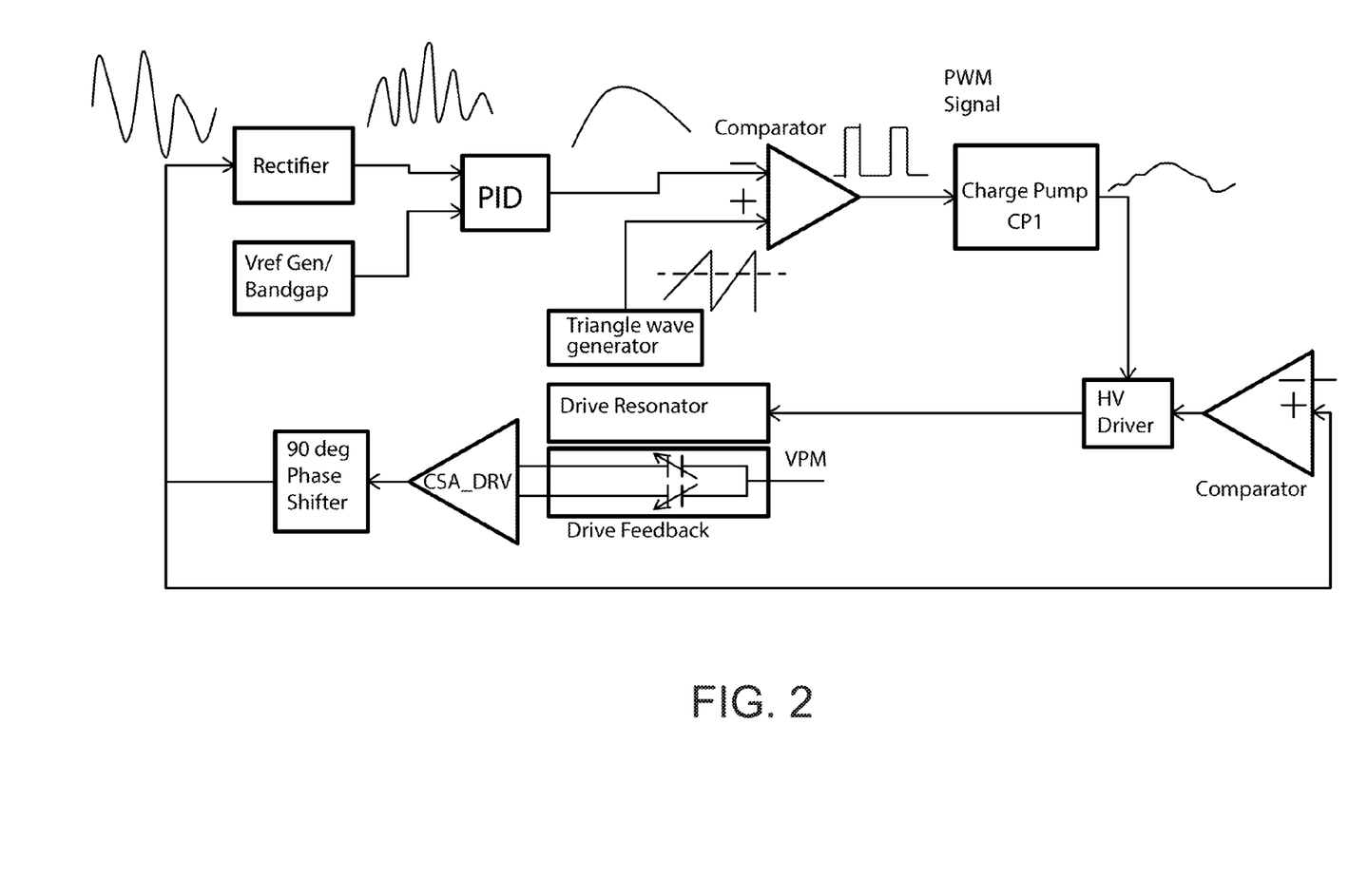
FIG. 2 is a simplified block diagram illustrating an AGC loop of an integrated MEMS inertial sensing device according to an embodiment of the present invention.

The present invention includes a drive loop configuration for an integrated MEMS inertial sensing device (i.e. gyroscope). According to an embodiment, a Gyroscope or inertial sensing system has a drive element that needs to resonate continuously at desired frequency and amplitude. To maintain this oscillation of MEMS element, the drive loop invented consists of a Signal acting as driving force to a MEMS resonator, the feedback signal from MEMS sensor, amplifier CSA_DRV, 90 degree phase shifter, rectifier, Proportional Integral Derivative (PID) controller, comparator, charge pump providing supply voltage to the High-Voltage (HV) driver and the signal input to the HV driver that is generated from the feedback element of MEMS driver. Embodiment of the drive loop, or Automatic Gain Control (AGC) loop circuit, is shown in FIG. 2.

The CSA_DRV senses the change in capacitance due to drive element and converts it in to voltage signal. In order to provide in-phase feedback signal, a 90 degree phase shifter, PS0, is added in the drive loop. The 90 degree phase shift can be implemented as differentiator or integrator or other known techniques.

The rectifier block rectifies the signal from phase shifter. A Low pass filter may typically be applied to this signal to provide average envelope of the detected feedback signal. The average amplitude is then compared with the desired amplitude provided by the reference signal coming from band-gap or similar on-chip or off-chip reference in the Proportional, Integral, Derivative (PID) controller. The PID block provides multiple functionalities in the Automatic Gain Control (AGC) loop. During the normal operation, when the loop is closed, the output of the PID block is proportional to the difference in amplitude between 'magnitude' of the detected signal (based on envelope information provided by rectifier), to the reference signal Vref. The proportional functionality may have some gain or may be unity. In order for the loop to filter out fast transients and act on 'average' information, the PID block incorporates an 'Integrator'. The time constant of the integrator is kept programmable so that the AGC loop can either be made faster or slower. However, before the drive loop is closed, for example right after power-up of Gyro, it is desired that the AGC loop act much faster instead of averaging for a long time. This functionality is implemented by the 'Differentiator' of the PID block. The differentiator allows shorter time to close the loop which helps in smaller 'start-up time' for the Gyroscope.

When the MEMS drive resonator generates signal at lower amplitude than desired, the AGC loop needs to act in a way that will increase the force to the MEMS driver resonator which will, in turn, increase the feedback signal. On the other hand when the MEMS drive resonator generates signal at higher amplitude than desired, the AGC loop needs to act in a way that will decrease the force to the MEMS driver resonator which will, in turn, decrease the feedback signal.

This invention proposes an implementation that implements this AGC mechanism in an efficient way at low power.

Output of the PID block is proportional to the difference between the signal received from the drive feedback (CSA_DRV) and desired reference. In this invention, a Pulse Width Modulated (PWM) signal is derived based on output of PID block.

A triangle wave generator creates triangular pulses. For example, this waveform may be implemented by linearly charging & discharging capacitor. The triangular waveform is then compared with output of the PID in the 'comparator' block.

If the PID block output is at desired level (Vref), then the comparator outputs PWM pulses that maintain current value out of the charge pump. If the PID block output is lower than desired, the duty cycle of the PWM pulses is effectively increased. If the PID block output is higher than desired, the duty cycle of the PWM pulses is effectively reduced.

Output of charge pump is proportional to the PWM duty cycle. For example, charge pump architecture is designed in order to increase the charge pump output amplitude when duty cycle of PWM is higher than 50%, reduce it when duty cycle is less than 50% and maintain the output at the current value when the duty cycle is 50%.

Figure 3:
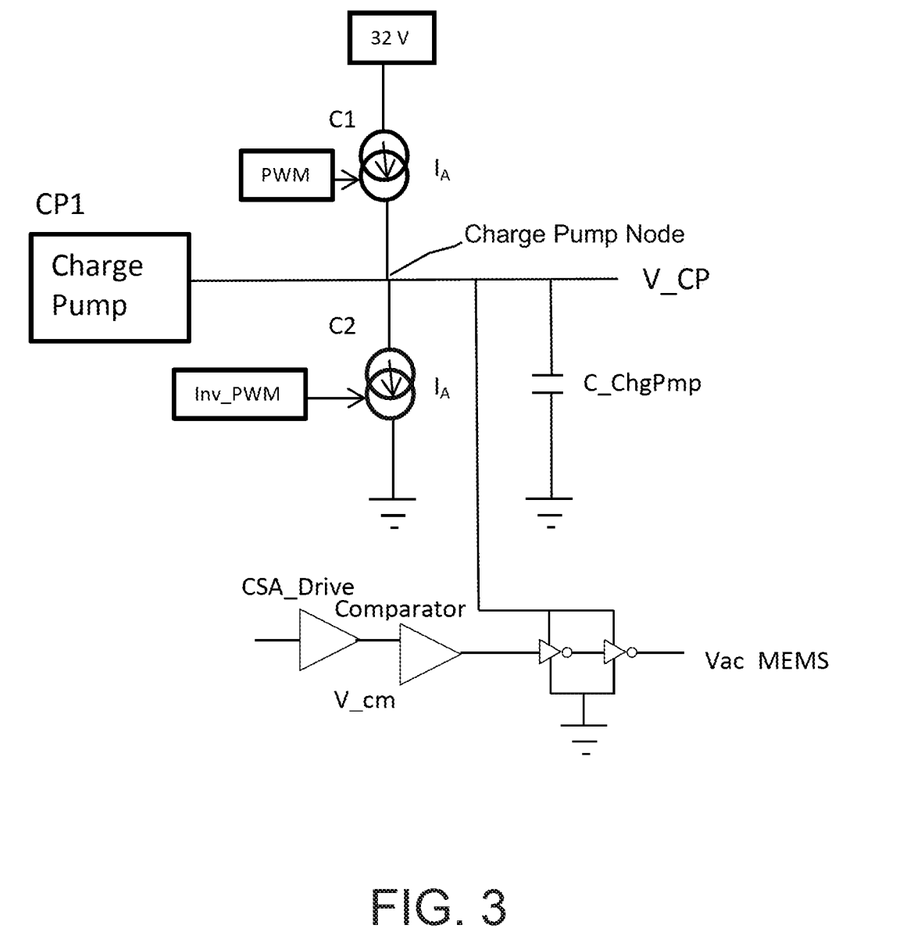
FIG. 3 is a simplified block diagram illustrating a charge pump of an integrated MEMS inertial sensing device according to an embodiment of the present invention.

FIG. 3. shows one embodiment that allows implementation of the functionality described above for PID and charge pump CP1 combined together. For this implementation, both the PWM pulse and its inverted pulse, referred as "inv-PWM" are used. The When the PWM output is HIGH value, then the current source C1 sources current IA and adds to the charge on capacitor C_chgpmp. The capacitor C_chgpmp may be on-chip capacitor, off-chip capacitor or partially on-chip and partially off-chip capacitor. Adding more charge increases value of V_CP voltage. In the time duration when the PWM pulse is LOW, inv_PWM is HIGH. In this time duration, current source C2 drains current of amplitude IA from the capacitor C_chgpmp. This reduces voltage V_CP.

When the duty cycle of PWM pulse is large than 50%, C1 adds more charges on C_chgpmp than the charge removed by current source C2. This will increase value of V_CP. On the other hand, when the duty cycle of PWM pulse is smaller than 50%, C1 adds less charges on C_chgpmp than the charge removed by current source C2. This will reduce V_CP. When the duty cycle is exactly 50%, the added and deleted charges are equal and the voltage V_CP will remain at its current value.

The "Integration" functionality of PID is automatically implemented by the time constant proportional to C_chgpmp and the value of IA. The Differentiator functionality is implemented by changing IA in the start-up duration so that the time constant is reduced and the V_CP voltage changes fast thereby reducing 'start-up time'.

Another innovation is that C_chgpmp may be driven by a charge pump CP2 (shown in FIG. 5) in addition to the capacitor C_chgpmp and the current sources. CP2 will pump up voltage from external low voltage (e.g. 1.8V) to desired high voltage (e.g. 10V). CP2 helps in maintaining a desired voltage on V_CP. The circuits constituting current sources C1, C2 contribute in either incrementing, decrementing or maintaining the nominal value from the charge pump.

Another inventive aspect is that the AGC is implemented as combination of Charge pump acting as power supply to the HV driver. The HV driver can be either analog HV amplifier or simple inverter. The supply voltage of HV driver is provided from charge pump CP1 and provides one means of controlling the output amplitude from HV driver.

The maximum value or amplitude of the HV driver is then effectively controlled by the charge pump. In one embodiment, the input to the HV diver may be a pulse. The output of the HV driver can pulse whose amplitude is controlled by the charge pump. Another embodiment is that the HV driver can simply be a HV inverter. Charge pump powers the HV driver block. If charge pump output is higher, the HV driver outputs proportionally higher amplitude pulses which will inject more Force, proportional to product of DC and AC voltage output from HV driver, in to MEMS driver-resonator. The displacement generated by the resonator is proportional to the input force and the Q of the resonator. E.g. larger the Q, larger is the displacement. Also, for a given Q, larger the force, larger is the displacement of MEMS drive element. Larger displacement of MEMS element generates larger signal (for example as capacitance change). Thus, the AGC loop acts in a way that generated desired signal amplitude out of the drive signal and equivalently, maintains MEMS resonator velocity as desired frequency and amplitude.

The PID block also provides Differential signal which is necessary for kick-start of the AGC loop in order to pump up the charge pump output faster especially during power on. In the normal mode, an integrator integrates the output of PID so that noise pulses do not cause undesired changes in the AGC path.

One of the advantages of proposed AGC loop is that the charge pump, inherently includes a 'time constant' for charging up of its output voltage. This incorporates the Low pass functionality in to the AGC loop without requiring additional circuitry.

Figure 4:
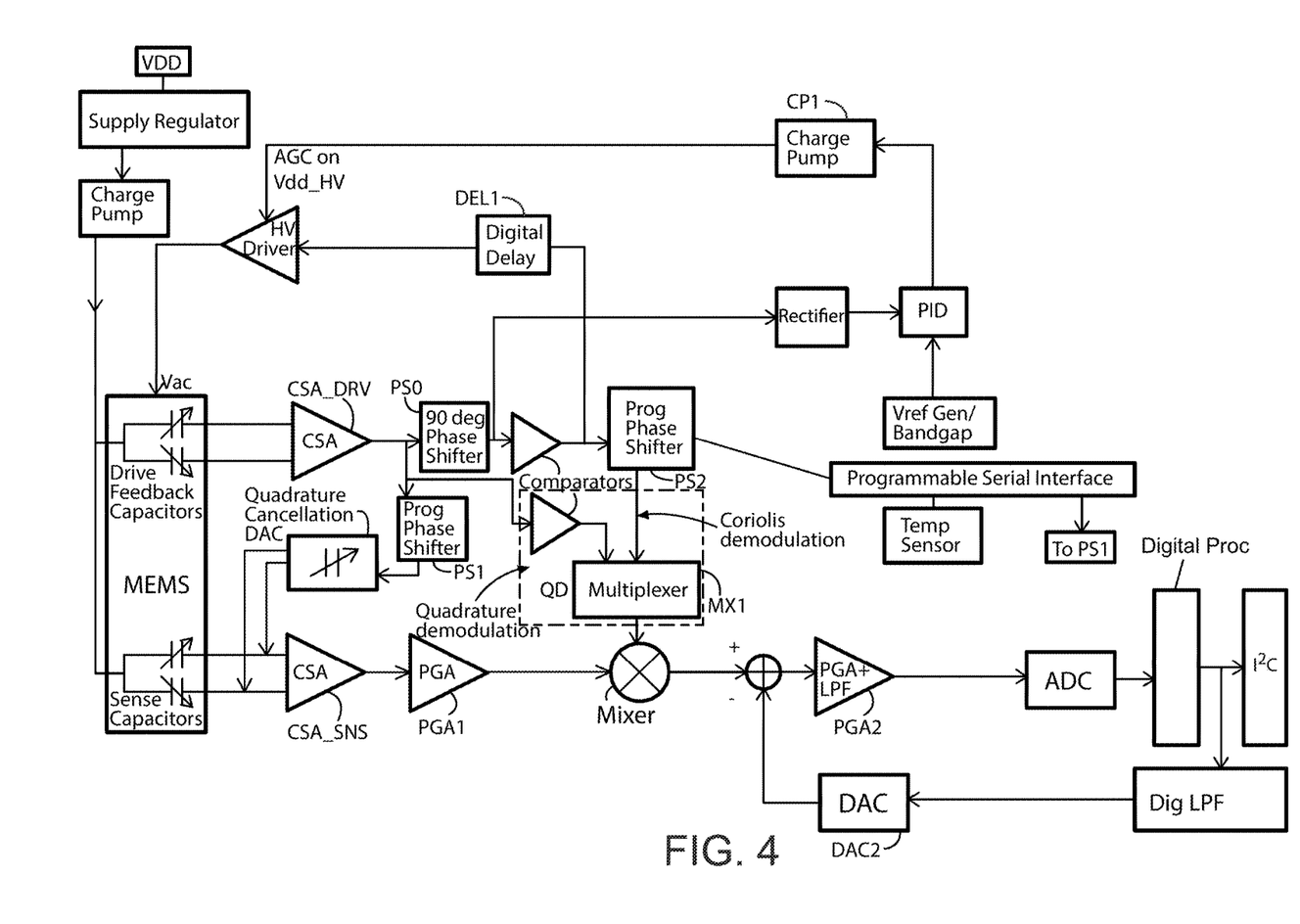
FIG. 4 is a simplified block diagram illustrating a system having an integrated MEMS gyroscope architecture according to an embodiment of the present invention.

FIG. 4 is a simplified block diagram illustrating a system having an integrated MEMS gyroscope architecture according to an embodiment of the present invention. Some included components are the Charge Sense Amplifiers (CSA), Programmable Gain Amplifier (PGA), Low Pass Filter (LPF), I2C. The CSAs is used for processing signals from the drive path as well as sense path of a Gyroscope or other MEMS inertial sensing device. The I2C is a serial bus communication to digital registers on the chip.

The MEMS block shown in FIG. 4 is single or multi-axis MEMS gyroscope element. The sensing element is shown as capacitive but other sensing elements are also possible and the first amplifier interfacing with the MEMS element is designed appropriately.

The Gyroscope has a drive element that needs to resonate continuously at desired frequency and amplitude. To maintain this oscillation of MEMS element, the drive loop consisting of CSA_DRV, phase shifter (PS1), comparator, HV driver provides gain of signal at desired frequency of oscillation. The CSA_DRV senses the change in capacitance due to drive element and converts it in to voltage signal.

In order to provide in-phase feedback signal, a 90 degree phase shifter, PS0, is added in the drive loop. The 90 degree phase shift can be implemented as differentiator or integrator or other known techniques.

The Rectifier, comparator, Proportional-Integral-Derivative (PID) controller, High Voltage (HV) driver form an Automatic Gain Control (AGC) loop. When the MEMS drive resonator generates signal at lower amplitude than desired, the amplitude of the rectified signal from the CSA, used for processing signal from drive path as well as sense path of Gyroscope, is smaller compared to the reference signal provided to the PID. The PID block generates output in Proportion to the difference of the input signals. The output of the PID block drives the charge pump. Output of PID block will be proportional to the difference in reference voltage input to the PID and the rectified signal amplitude. If output of PID is higher, then charge will provide larger voltage output. The charge pump powers the HV driver block. If charge pump output is higher, the HV driver outputs proportionally higher amplitude pulses which will inject more Force, proportional to product of dc and ac voltage output from HV driver, in to MEMS driver-resonator. The displacement generated by the resonator is proportional to the input force and the Q of the resonator. E.g. larger the Q, larger is the displacement. Also, for a given Q, larger the force, larger is the displacement of MEMS drive element. Larger displacement of MEMS element generates larger signal (for example as capacitance change). Thus, the AGC loop acts in a way that generated desired signal amplitude out of the drive signal and equivalently, maintains MEMS resonator velocity as desired frequency and amplitude.

The PID block also provide a differential signal, which is necessary for kick-start of the AGC loop in order to pump up the charge pump output faster especially during power on. In the normal mode, an integrator integrates the output of PID so that noise pulses do not cause undesired changes in the AGC path and makes the steady state error to be zero.

The rectifier, comparator, Proportional-Integral-Derivative (PID) controller, High Voltage (HV) driver, MEMS resonator, CSA_DRV and the 90 degree phase shifter, PS0, form an Automatic Gain Control (AGC) loop. When the MEMS drive resonator generates signal at lower amplitude than desired, the amplitude of the rectified signal from the CSA is smaller compared to the reference signal provided to the PID. The PID block generates output in proportion to the difference of the input signals. The output of the PID block controls the gain of the HV driver, which decides the amplitude of the AC voltage, Vac, driving the MEMS resonator.

By driving the MEMS drive capacitors with an AC voltage that is of low impedance, dependence of the AGC loop performance on MEMS leakage can be substantially eliminated. The displacement generated by the resonator is proportional to the input force and the Q of the resonator. E.g. larger the Q, larger is the displacement. Also, for a given Q, the larger the force, the larger is the displacement of MEMS drive element. Larger displacement of the MEMS element generates a larger signal (for example as capacitance change). Thus, the AGC loop acts in a way that generates a desired signal amplitude out of the drive signal and equivalently, maintains MEMS resonator velocity as desired frequency and amplitude.

The PID block also provide a differential signal, which is necessary for kick-start of the AGC loop in order to pump up the charge pump output faster especially during power on. In the normal mode, an integrator integrates the output of PID so that noise pulses do not cause undesired changes in the AGC path and makes the steady state error to be zero.

In a specific embodiment, the sensing mechanism of the gyroscope is based on a Coriolis force, which is proportional to the vector product of angular rate of the gyroscope and the velocity of the MEMS driver resonator. The Coriolis force generates a displacement of the MEMS sense element in a direction that is orthogonal to the drive velocity and the external angular rate. The displacement signal is sensed via a sense Charge Sense Amplifier (CSA). The signal at the output of the sense CSA will have a carrier signal at the frequency of the resonance of the drive resonator, which will be amplitude modulated by a signal proportional to the angular rate of motion.

The drive signal also gets injected in the sense path and is 90 degrees out of phase compared to the Coriolis displacement, and hence is termed "Quadrature coupling". A programmable Quadrature cancellation DAC is an array of programmable capacitors that allow a desired portion of the quadrature signal to be cancelled from the input signal. In addition, to accurately cancel the quadrature, which may have a different phase than 90 deg, a phase shifter PS1 is used in the present architecture embodiment.

The CSA-sense is a low noise amplifier with capacitive feedback. In order to maintain DC biasing at the amplifier input, a very high impedance feedback at low frequency is required. In various embodiments of the present invention, this configuration is realized by using MOS transistors operating in a sub-threshold region that can create impedances in the order of Giga-ohms. The feedback to maintain input common voltage is only desired at DC. In order to ensure little impact of the high impedance common mode feedback and to minimize noise impact at high frequency, a very low cut-off frequency low pass filter is added in the feedback path.

The Programmable Gain Amplifier 1 (PGA1) amplifies the signal from CSA to a desired level. The rate signal needs to be demodulated from the signal at the output of sense CSA. The mixer in the signal path achieves the demodulation by mixing the carrier signal coming out from the drive CSA with the composite signal coming from the sense-CSA amplified by the PGA.

In a specific embodiment, the mixer is implemented as a transmission gate. One input of the transmission gate is the pulse coming from the comparator after going through the programmable phase shifter PS2. Phase Shifter PS2 shifts pulses by a programmable amount from −180 deg to +180 deg thereby adjusting for both phase lead and lag between signal in drive loop verses signals in sense path.

The Programmable Gain Amplifier PGA2 amplifies the demodulated rate signal. PGA2 also includes a Low Pass Filtering function. An embodiment of the present invention includes a LPF by simply adding a capacitor in the feedback path of the PGA2. Since the carrier component is suppressed with the LPF in the PGA2, the dynamic range can be effectively used for desired rate signal amplification before converting to a digital domain.

A small phase shift with respect to 90 degrees may exist in the CSA drive, which will generate DC or low frequency components after demodulation, thereby consuming dynamic range after the mixer. According to a specific embodiment, a programmable phase shifter, PS2, can be configured within the architecture to effectively cancel this component.

According to another specific embodiment, a loop including or consisting of a digital low pass filter and DAC2 can be provided within the architecture. This loop cancels a small offset or low frequency component that may exist in the signal path due to offsets of analog blocks or DC or low frequency components produced by the mixer that is not in the range of rate signal frequency.

A high resolution (e.g. 16 bit) A/D converter (ADC) converts the demodulated rate signal. The A/D converter has inputs for multiple channels in order to multiplex the digital signal path for all of the channels. One of the inputs of the A/D converter is from the on-chip temperature sensor. The Temp sensor output can be effectively used to compensate for the effect of the resonator variation with temperature either in the analog or digital domain. In an embodiment, the temperature sensor output can be read and used to program the phase shifter PS2 to compensate for changes in phase occurring due to changes in temperature. Temperature compensation can also be applied in the digital path with certain programmability. Also, multiple axes (e.g. three axis for a 3 degrees of freedom (3DOF) Gyro) of the Gyro signal are multiplexed at the ADC.

The digital path can have signal processing such as programmable Low Pass Filters to cancel noise outside of a band of interest. The digital signal path also has a programmable High Pass Filter (HPF) to substantially eliminate DC components, offset, or very low frequency artifacts that are not within the expected rate signal band.

The system architecture of FIG. 4 also shows a test mode that allows measurement of quadrature signal using blocks QD, comparator and multiplexer. In this embodiment, a voltage corresponding to the drive displacement is used to demodulate the signal form the MEMS sense capacitors. This mode is multiplexed with the 'normal' mode in which the voltage corresponding to the drive velocity is used to demodulate the signal from the MEMS sense capacitors. The quadrature mode provides a method to quantify the residual 'feed-through' or 'quadrature' signal from the MEMS drive capacitors to the sense capacitors, and to observe how it varies with ambient parameters such as temperature, humidity, etc.

In a specific embodiment, a digital delay, using block DEL1 is introduced in the frequency control loop of the drive servo. Varying the delay causes the loop to lock into different frequencies. For instance, the delay can be varied to make the loop lock into the 3-dB frequencies of the MEMS drive resonator and measure the 3 dB bandwidth and quality factor.

Figure 5:
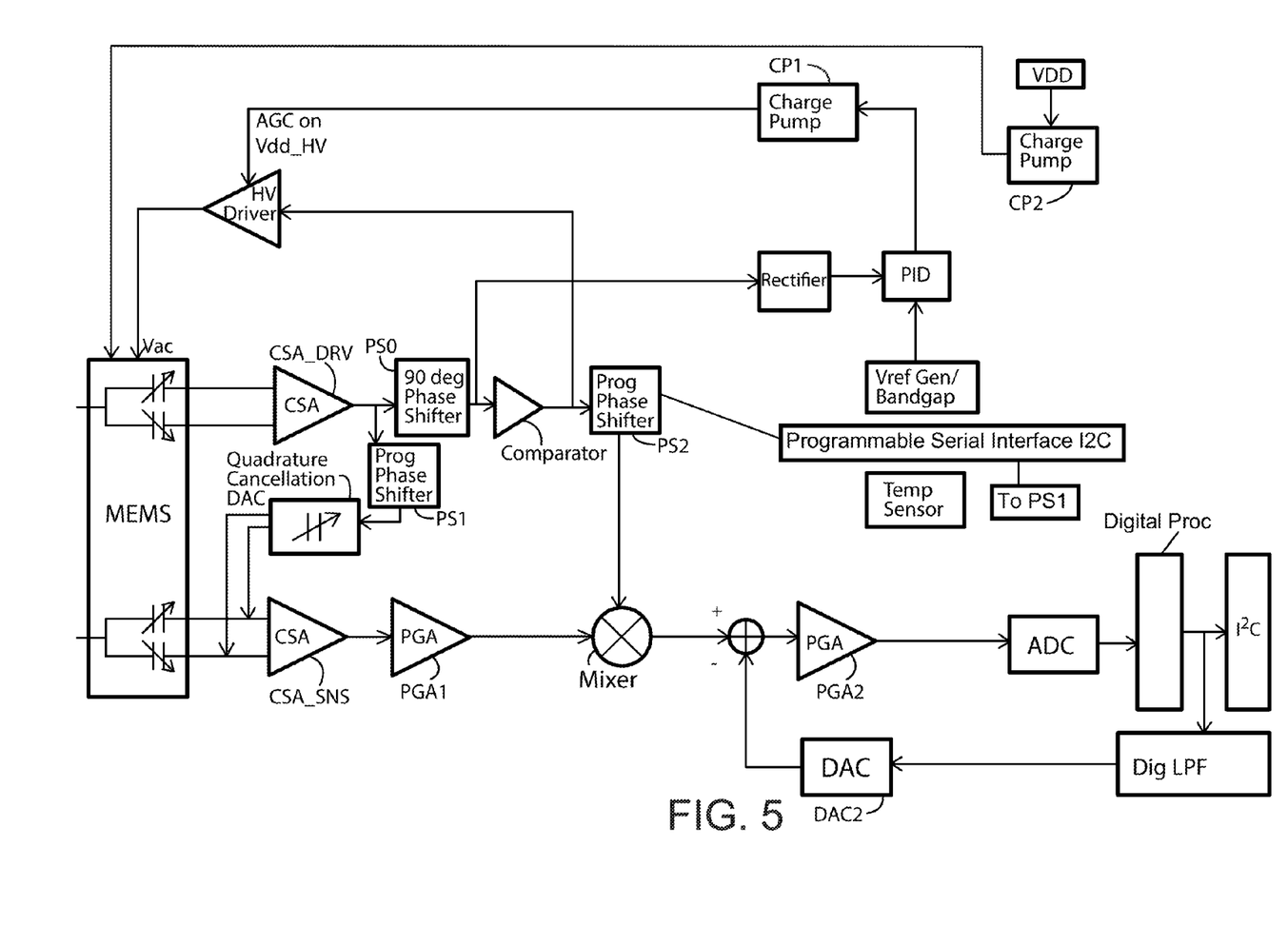
FIG. 5 is a simplified block diagram illustrating a system having an integrated MEMS gyroscope architecture according to an embodiment of the present invention.

FIG. 5 is a simplified block diagram illustrating a system having an integrated MEMS gyroscope architecture according to an embodiment of the present invention. Similar to FIG. 4, the MEMS block shown in FIG. 5 is single or multi-axis MEMS gyroscope element. The sensing element is shown as capacitive but other sensing elements are also possible and the first amplifier interfacing with the MEMS element is designed appropriately. Several of the components discussed for FIG. 4 are also present in the embodiment depicted by FIG. 5. Thus, further information regarding of these components can be found in the previous descriptions.

One of the benefits of proposed AGC loop is that the charge pump, inherently includes a 'time constant' for charging up of its output voltage. This incorporates the Low pass functionality in to the AGC loop without requiring additional circuitry.

The HV driver can be either analog HV amplifier or simple inverter. The supply voltage of HV driver is provided from charge pump CP1 and provides one means of controlling the output amplitude from HV driver.

An additional charge pump, CP2, is designed to allow external power supply voltage that can be lower compared to on-chip voltages. For example, the external power can be 1.8V and internal voltages can be 3.3V and much higher voltages at charge pump for HV driver.

The multiple charge pump architecture allows more efficient usage of power. For example, the boosting of external supply voltage 1.8V may have to be boosted to 32V. This can be done as boost from 1.8V to 3.3V and from 3.3V to 32V. This feature will allow usage of device at higher voltage to bypass one of the charge pumps CP2.

The layout of the Gyroscope MEMS and CMOS is very critical to achieve optimal performance. All the out of plane sense signal plates are shielded with metal shield on sides (on same metal layer) as well as on layers below the sense plates. In a specific embodiment, a shield may be placed by skipping one or more metal layers to minimize parasitic capacitance. For example, if sense plate is on metal 6, the shield may be on metal 4 instead of metal 5 in order to provide more isolation & reduce parasitics. An example is shown in FIG. 1, which shows that CMOS IC layer 120 can include CMOS devices (not shown) in substrate 110 and can including multilevel metal interconnect structures, e.g., six metal layers, M1-M6. The integrated MEMS gyroscope device 100 also includes a MEMS gyroscope 140 overlying the CMOS surface region, and includes an out-of-plane sense plate 121. Metal regions 151 and 152 are shields on the sides of the plate in the metal 6 layer, while 153 is the shield below the plate on the metal 4 layer.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A MEMS inertial sensing device, the device comprising:
   a MEMS inertial sensor; and
   an AGC loop circuit electrically coupled to the MEMS inertial sensor, the AGC loop circuit including:
   a rectifier,
   a proportional-integral-derivative (PID) controller, an input of the PID controller being electrically connected to an output of the rectifier,
   a comparator having an input electrically connected to an output of the PID controller,
   a charge pump having an input electrically connected to an output of the comparator, and
   a high-voltage (HV) driver having an input electrically connected to an output of the charge pump.

2. The MEMS inertial sensing device of claim 1 wherein the PID controller includes an integrator and a differentiator, wherein the integrator uses a programmable time constant to determine a variable operational speed of the AGC loop circuit, and wherein the differentiator is configured to change a current for charging and discharging a capacitor in the charge pump in a start-up duration so the programmable time constant is reduced and a capacitor voltage changes faster to reduce a start-up time of the AGC loop circuit.

3. The MEMS inertial sensing device of claim 1 wherein the PID controller is configured to output a differential PWM signal having a PWM signal and an inverted PWM signal, and wherein the output of the charge pump is configured to be proportional to a duty cycle of the PWM signal.

4. The MEMS inertial sensing device of claim 3 wherein the charge pump is a first charge pump, and the AGC loop circuit further comprises a second charge pump coupled to a charge pump node, wherein a first current source is coupled to the charge pump node, the PWM signal, and a supply voltage, and wherein a second current source is coupled to the charge pump node, the inverted PWM signal, and a ground.

5. The MEMS inertial sensing device of claim 3 further comprising a charge pump capacitor coupled to the charge pump node, the second charge pump, the first and second current sources, and the charge pump capacitor being configured to maintain a desired voltage on the charge pump node.

6. The MEMS inertial sensing device of claim 1 further comprising a triangle wave generator coupled to the comparator and configured to generate triangular pulses, wherein the output of the PID is compared to the triangular pulses by the comparator.

7. The MEMS inertial sensing device of claim 1 wherein the charge pump is configured as a power supply to the HV driver.

8. A MEMS inertial sensing device, the device comprising:
a MEMS inertial sensor;
an AGC loop circuit electrically coupled to the MEMS inertial sensor, the AGC loop circuit including:
a rectifier,
a proportional-integral-derivative (PID) controller, an input of the PID controller being electrically connected to an output of the rectifier,
a comparator having an input electrically connected to an output of the PID controller,
a charge pump having an input electrically connected to an output of the comparator, and
a high-voltage (HV) driver having an input electrically connected to an output of the charge pump; and
a sense path electrically coupled to the MEMS inertial sensor, the sense path including a Charge Sense Amplifier (CSA_SNS), a Programmable Gain Amplifier (PGA1), a mixer, a second Programmable Gain Amplifier (PGA2), an A/D converter (ADC), and digital processing circuits.

9. The MEMS inertial sensing device of claim 8 wherein the PID controller includes an integrator and a differentiator, wherein the integrator uses a programmable time constant to determine a variable operational speed of the AGC loop circuit, and wherein the differentiator is configured to change a current for charging and discharging a capacitor in the charge pump in a start-up duration so the programmable time constant is reduced and a capacitor voltage changes faster to reduce a start-up time of the AGC loop circuit.

10. The MEMS inertial sensing device of claim 8 wherein the PID controller is configured to output a differential PWM signal having a PWM signal and an inverted PWM signal, and wherein the output of the charge pump is configured to be proportional to a duty cycle of the PWM signal.

11. An AGC loop circuit, comprising:
a rectifier,
a proportional-integral-derivative (PID) controller, an input of the PID controller being electrically connected to an output of the rectifier,
a comparator having an input electrically connected to an output of the PID controller,
a charge pump having an input electrically connected to an output of the comparator, and
a high-voltage (HV) driver having an input electrically connected to an output of the charge pump.

12. The circuit of claim 11 wherein the PID controller includes an integrator and a differentiator, wherein the integrator uses a programmable time constant to determine a variable operational speed of the AGC loop circuit, and wherein the differentiator is configured to change a current for charging and discharging a capacitor in the charge pump in a start-up duration so the programmable time constant is reduced and a capacitor voltage changes faster to reduce a start-up time of the AGC loop circuit.

13. The circuit of claim 11 wherein the PID controller is configured to output a differential PWM signal having a PWM signal and an inverted PWM signal, and wherein the output of the charge pump is configured to be proportional to a duty cycle of the PWM signal.

14. The circuit of claim 13 wherein the charge pump is a first charge pump, and the AGC loop circuit further comprises a second charge pump coupled to a charge pump node, wherein a first current source is coupled to the charge pump node, the PWM signal, and a supply voltage, and wherein a second current source is coupled to the charge pump node, the inverted PWM signal, and a ground.

15. The circuit of claim 14 further comprising a charge pump capacitor coupled to the charge pump node, the second charge pump, the first and second current sources, and the charge pump capacitor being configured to maintain a desired voltage on the charge pump node.

16. The circuit of claim 11 further comprising a triangle wave generator coupled to the comparator and configured to generate triangular pulses, wherein the output of the PID is compared to the triangular pulses by the comparator.

17. The circuit of claim 11 wherein the charge pump is configured as a power supply to the HV driver.

18. An AGC loop circuit, comprising:
a rectifier,
a proportional-integral-derivative (PID) controller, an input of the PID controller being electrically connected to an output of the rectifier,
a comparator having an input electrically connected to an output of the PID controller,
a charge pump having an input electrically connected to an output of the comparator, and
a high-voltage (HV) driver having an input electrically connected to an output of the charge pump;
wherein the PID controller includes an integrator and a differentiator, wherein the integrator uses a programmable time constant to determine a variable operational speed of the AGC loop circuit, and wherein the differentiator is configured to change a current for charging and discharging a capacitor in the charge pump in a start-up duration so the time constant is reduced and a capacitor voltage changes faster to reduce a start-up time of the AGC loop circuit.

19. The circuit of claim 18 wherein the PID controller is configured to output a differential PWM signal having a PWM signal and an inverted PWM signal, and wherein the output of the charge pump is configured to be proportional to a duty cycle of the PWM signal.

20. The circuit of claim 18 wherein the charge pump is a first charge pump, and the AGC loop circuit further comprises a second charge pump coupled to a charge pump node, wherein a first current source is coupled to the charge pump node, the PWM signal, and a supply voltage, and wherein a second current source is coupled to the charge pump node, the inverted PWM signal, and a ground.

21. The circuit of claim 18 further comprising a charge pump capacitor coupled to the charge pump node, the second charge pump, the first and second current sources, and the charge pump capacitor being configured to maintain a desired voltage on the charge pump node.

22. The circuit of claim 18 further comprising a triangle wave generator coupled to the comparator and configured to generate triangular pulses, wherein the output of the PID is compared to the triangular pulses by the comparator.

23. The circuit of claim 18 wherein the charge pump is configured as a power supply to the HV driver.

* * * * *